United States Patent [19]
Smith et al.

[11] Patent Number: 5,638,728
[45] Date of Patent: Jun. 17, 1997

[54] REPLACEABLE TOOL SUPPORT WITH ARCUATELY CURVED SURFACE PORTION

[75] Inventors: David A. Smith, New Haven; Douglas O. Perry, Leo, both of Ind.

[73] Assignee: Kaiser Tool Company, Inc., Fort Wayne, Ind.

[21] Appl. No.: 438,995

[22] Filed: May 11, 1995

[51] Int. Cl.$^6$ ................................... B23B 29/12
[52] U.S. Cl. ........................... 82/158; 407/101
[58] Field of Search .................. 82/123, 158; 407/101, 407/117

[56] References Cited

U.S. PATENT DOCUMENTS

| | | | |
|---|---|---|---|
| 3,611,525 | 10/1971 | Cochran | 407/117 |
| 3,894,322 | 7/1975 | Pano . | |
| 4,776,733 | 10/1988 | Pettersson . | |
| 4,778,311 | 10/1988 | Niemi | 407/116 |
| 4,834,592 | 5/1989 | Niebauer et al. | 407/115 |
| 4,957,396 | 9/1990 | Niebauer | 407/114 |
| 4,963,060 | 10/1990 | Niebauer et al. . | |
| 4,973,204 | 11/1990 | Mihic . | |
| 5,076,739 | 12/1991 | Pano . | |
| 5,085,541 | 2/1992 | Simpson, III . | |
| 5,088,862 | 2/1992 | Niebauer et al. | 407/114 |
| 5,135,336 | 8/1992 | Noguchi et al. | 407/117 |

*Primary Examiner*—M. Rachuba
*Assistant Examiner*—Kenneth J. Hansen
*Attorney, Agent, or Firm*—Welsh & Katz, Ltd.

[57] ABSTRACT

A tool support adapted for use with a tool holder having an elongated shank which is mounted in a machine tool, is useful to support an insert for cutting deep grooves in a workpiece. The tool support has a body having a central body portion and a second body portion extending from the central body portion, which second body portion has a first surface portion adapted to support an insert thereon and a second portion extending arcuately from the first surface portion which is adapted to enter arcuate or circular spaces or grooves formed by the tool in a workpiece. The body portions are preferably integral and preferably includes a portion which engages the tool holder and inhibits vertical movement of the tool support relative to the tool holder and a third body portion adapted to cooperate with a clamping member to clamp the insert to the tool support.

12 Claims, 2 Drawing Sheets

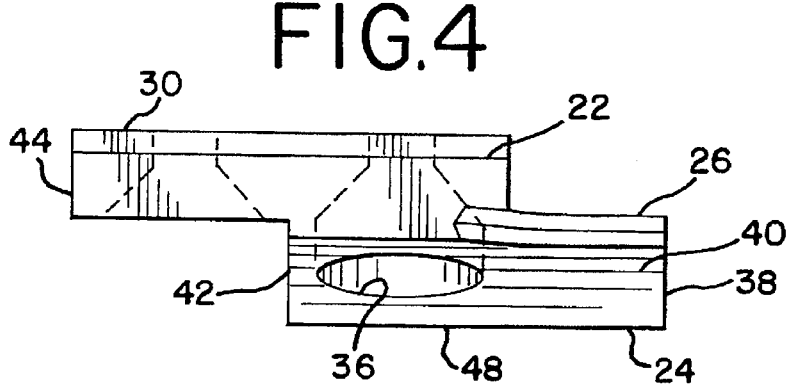
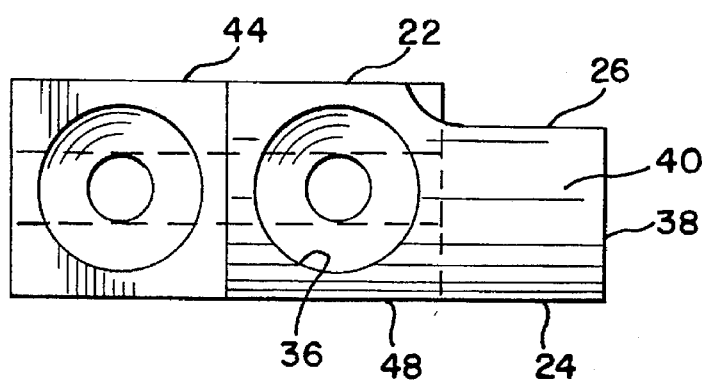
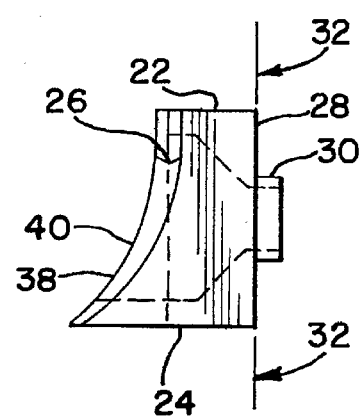
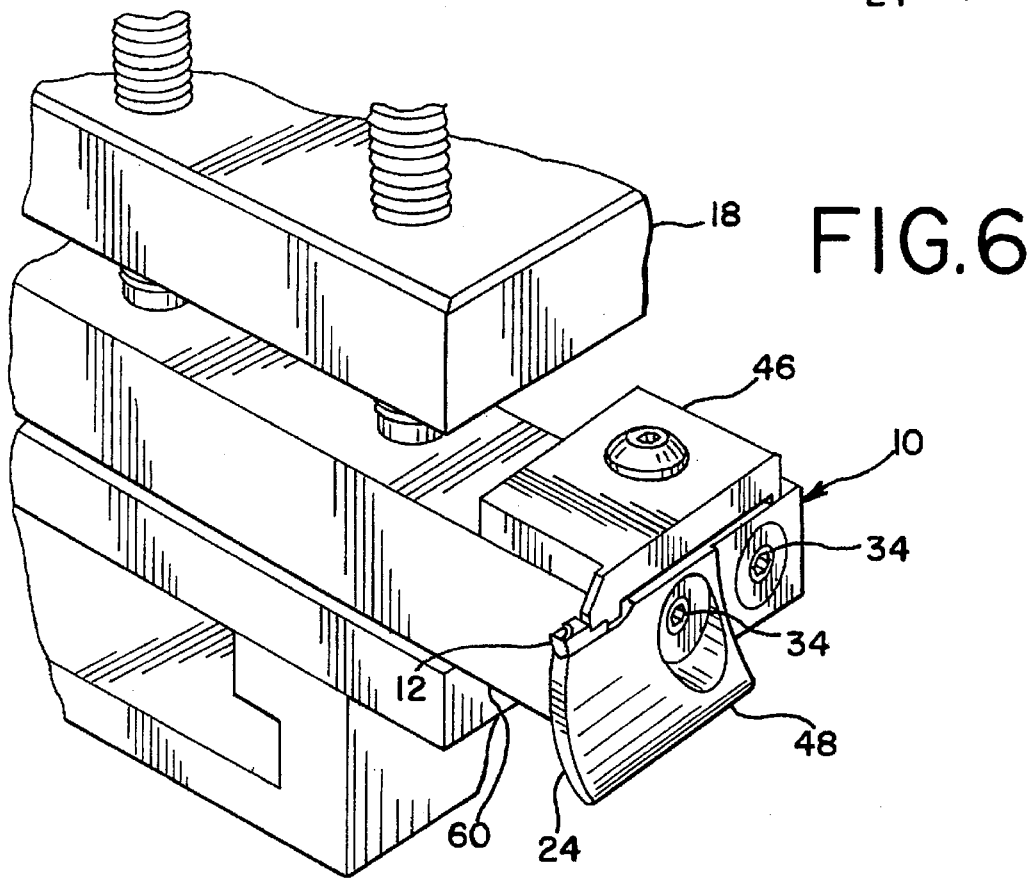

REPLACEABLE TOOL SUPPORT WITH ARCUATELY CURVED SURFACE PORTION

BACKGROUND OF THE INVENTION

This invention relates to tool supports for machine tools for cutting grooves, and, more particularly, to tool supports for tools for cutting deep grooves in the face of a workpiece.

The art of cutting grooves in the face of a metal workpiece, particularly cutting relatively deep grooves, presents a unique problem because of the extreme pressures placed upon the cutting tool or insert (hereinafter "insert"), without the space available beneath the insert for its support where the insert must enter the groove as the insert advances into the workpiece. While tool supports or holders have been developed to support inserts, for example the holder shown in U.S. Pat. No. 3,611,525, and may be adequate where cuts or grooves are to made in the side of the workpiece, those holders do not provide sufficient support beneath the insert to permit the cutting of a deep groove in the face of the workpiece. As noted in aforementioned patent, the force on the insert is essentially downward, and if the insert overhangs the support by more than a minimal distance, a very large moment is generated which often causes the insert to break, particularly if the insert is formed of a relatively brittle metal or alloy such as a carbide alloy.

One proposal to counter the forces tending to cause the insert to break where it must overhang the support is to increase the height of the insert to provide added strength against breaking forces. However, as noted in U.S. Pat. 3,611,525, increasing the height of the insert decreases the ability to support the insert against moving sideways or tilting. A additional problem with an insert of increased height encountered where a deep groove is to be cut, is that the additional height will interfere with or bind the insert in the groove as the insert penetrates into the workpiece.

Another proposed improvement in tool supports, is shown in U.S. Pat. No. 3,894,322. However, in that patent inserts with only relatively short overhangs are apparently contemplated, and no additional provision is made to support inserts for deep grooving of the face of a workpiece. A frusto-conical surface is provided between a front side surface of the narrow wall of the holder which supports the insert and the shank portion of the holder presumably to strengthen the former.

None of the proposed tool support arrangements, for example, those noted above, satisfactorily solve the problem of providing support for inserts for cutting deep grooves in the face of a workpiece.

SUMMARY OF THE INVENTION

Thus, it is one object of the present invention to provide a tool support for an insert for use in cutting deep grooves in the face of a workpiece.

Another object of the present invention is to provide a tool support which is replaceable with respect to a tool holder or shank which permits the support of a variety of sizes of inserts to cut grooves of differing diametrical thicknesses and radii of curvature with a common shank which may be mounted to a machine tool.

It is still another object of the present invention to provide a tool support for an insert for cutting deep grooves in the face of a workpiece wherein a portion of the support is adapted to enter the groove being cut by the insert to provide support therefore as the cutting progresses.

These and other objects and advantages of the present invention will be apparent from the following description and drawing.

In accordance with the present invention, a replaceable tool support for an insert for cutting relatively deep grooves in the face of a workpiece is provided. The tool support of the present invention is intended to be used with a tool holder having an elongated shank which is mounted in a machine tool in the manner known to the art. The tool holder, tool support and insert may be mounted on a stationary portion of the machine tool and the workpiece rotated, as on a lathe, or the tool holder, tool support and insert may be mounted on a rotating portion and the workpiece mounted on a stationary portion of the machine tool, as on a milling type machine. For the purpose of simplicity only, the tool support of the present invention will be described and illustrated as being mounted on the stationary portion of the machine tool, with the workpiece mounted so as to rotate with its face facing the tool support and the insert supported thereon.

The tool support of the present invention comprises a body having a central body portion. Extending from the central body portion is a second body portion which has a first surface portion adapted to support an insert thereon. The second body portion of the tool support also has a second portion extending arcuately from the first surface portion which is adapted to enter arcuate or circular spaces or grooves formed by the tool in a workpiece. It is preferred that all the portions of the tool support of the present invention are integral parts of the support.

The tool support body has at least one other surface having a portion adapted to be placed in abutting relationship to the tool holder and forming a plane defined by the junction between the other surface and the tool holder. Preferably the other surface is the surface of the central body portion which faces the tool holder. The tool support further has means for removably securing the body of the support to the tool holder with the at least one other surface in abutting relationship to the tool holder.

The arcuately extending portion of the second body portion extends arcuately from the first surface portion away from the plane defined by the junction between the other surface and the tool holder. In this manner the second body portion may enter the arcuate or circular spaces or grooves formed by the insert in a workpiece and the tool support body can be removably replaced with respect to the tool holder to permit the use of selected inserts and tool supports with a single tool holder.

It is preferred that the arcuately extending portion of the second body portion arcuately converges as it extends from the first surface portion. By arcuately converging, the portions tapers to a narrower end portion to further ensure that the portion of the tool support entering the space or groove cut into the workpiece does not touch the walls of the space or groove and does not bind against those walls. Preferably, the arcuate outer surface, i.e. the arcuate surface furthest from the plane noted above, extends along at least a portion of the central body portion. It is believed that, in this manner, the arcuate portion is supported against downward forces transmitted therethrough from the insert supported on the first surface portion which would tend to cause the arcuate portion to break if it were not supported in the downwardly and rearwardly direction, while providing further support for the insert.

The body of the tool support of the present invention further includes a portion adapted to cooperate with clamping means for securing the insert to the first surface. Preferably, that body portion includes means for removably securing the tool support to the tool holder, and, more preferably, the body portion adapted to cooperate with clamping means is a portion of the central body portion. Alternatively, the body portion adapted to cooperate with clamping means can be the central body portion or a third body portion extending from said central body portion. In the preferred embodiment, the third body portion is present and extends from the central body portion in the opposite direction from the direction that the second body potion extends, and both the central body portion and the third body portion include means for removably securing said body to the tool holder. The means for removably securing said body to the tool holder can be machine screws with integral locking means threaded into threaded holes in the tool holder. Preferably, the central body portion includes means for removably securing the body to the tool holder, such as the means described above, which extends through the arcuate outer surface portion thereof.

In preferred embodiment, the central body portion of the tool support body has a first thickness and the second body portion has a substantially lesser thickness. It is also preferred that the third body portion extending from the central body portion and adapted to cooperate with clamping means is of lesser thickness than the central body portion. Thus, the third body portion may be rectangular in cross-section, while the central body portion may have a thicker cross-section at its bottom, as determined by the extension of the outer arcuate surface from the second body portion, than at its top where the thickness may be substantially the same as the thickness of the third body portion. It is also preferred that at least one other surface of the central body portion and the surface of the third portion aligned with the at least other surface adapted to be placed in abutting relationship to the tool holder include a projection integral with those surfaces and adapted to engage a rabbet or receiving channel in the tool holder in close fitting engagement so as to inhibit vertical movement of the tool support relative to the tool holder, particularly during the cutting of deep grooves in a workpiece.

In an alternate embodiment, the tool support may be positioned 90 degrees from the elongated sides and surfaces of the tool holder, with the preferred rabbet or receiving channel positioned in the head end of the holder.

BRIEF DESCRIPTION OF THE DRAWING

FIG. 3 is a side elevational view of the tool support of FIG. 2;

FIG. 4 is a top plan view of the tool support of FIG. 2;

FIG. 5 is a front end view of the tool support of FIG. 2; and

FIG. 6 is a perspective view of an alternate embodiment in accordance with the present invention with an insert mounted and clamped to the tool support and secured to a tool holder as in FIG. 1.

DESCRIPTION OF THE PREFERRED EMBODIMENTS

Figure 1:
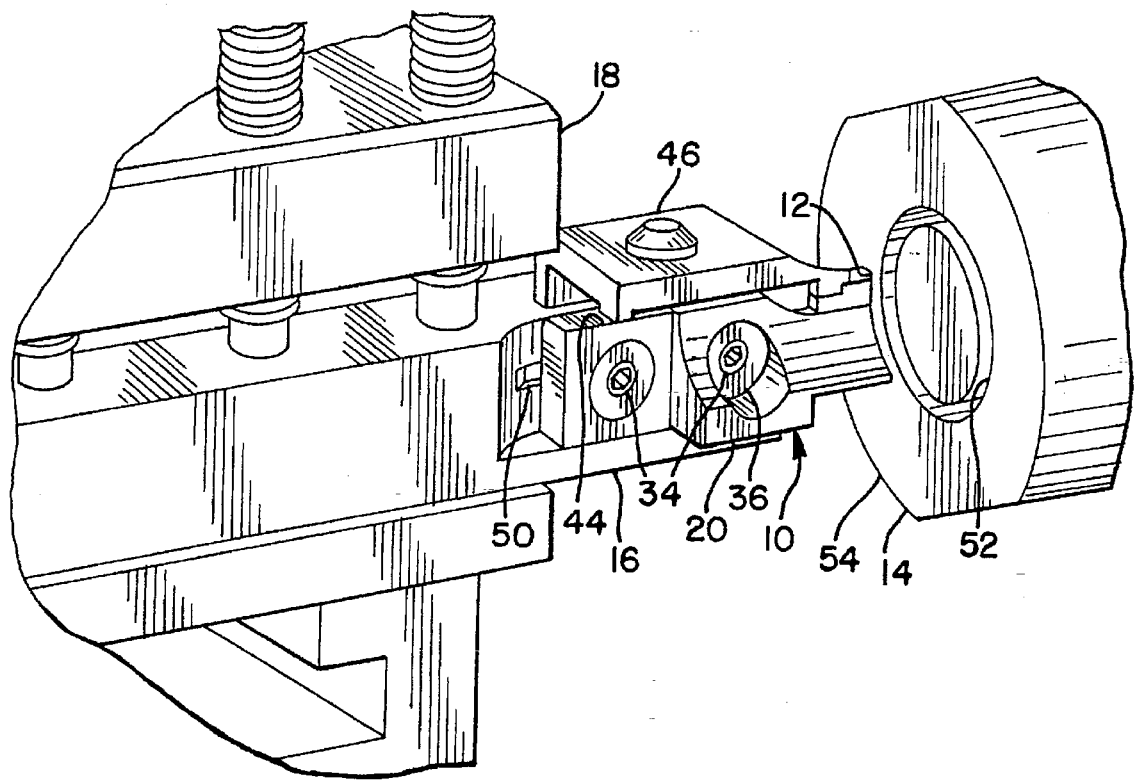
FIG. 1 is a perspective view of a tool support in accordance with the present invention with an insert mounted and clamped thereto and secured to a tool holder, in relation to a workpiece.

In a preferred embodiment of the present invention as illustrated in FIGS. 1–5, a replaceable tool support 10 is provided to support an insert 12 capable of cutting a groove in a workpiece 14. Tool support 10 is adapted for use with a tool holder 16, which can be in the form of an elongated shank having a square cross-section as shown, or can have another shape, such as a round cross-section (not shown). Tool holder 16 conveniently is adapted to be mounted in a machine tool 18, in a manner known to the art.

Tool support 10, in the embodiment illustrated in FIGS. 1–5, includes a tool support body 20 having a central body portion 22 and a second body portion 24. Second body portion 24 extends from central body portion 22 and has a first surface 26 adapted to support a tool, such as insert 12. Conveniently, first surface 26 can be formed in a V-shape to support an insert 12 have a corresponding V-shape as its bottom surface, although other corresponding shapes can be used. Tool support 10 of this embodiment has another surface 28, which has a portion 30 adapted to be placed in abutting relationship with tool holder 16, the junction of portion 30 with tool holder 16 forming an imaginary plane 32. Surface 28 can be a surface of central body portion 22 which faces tool holder 16, as shown.

Tool support 10 is intended to be used with means, such as machine screws 34, for removably securing tool support body 20 to tool holder 16 with surface 28 in abutting relationship with tool holder 16. Tool support body 20 can include one or more holes 36, or other apertures, through which machine screws 34 may extend and threadingly engage corresponding threaded holes in tool holder 16. Machine screws 34 can have integral locking means to retain the screws upon tightening the same in the threaded holes in tool holder 16.

Second body portion 24 of tool support 10 has a portion 38 which extends arcuately from the first surface 26 away from imaginary plane 32 and converges as it extends from surface 26. The outer arcuate surface 40 of arcuate portion 38 extends along at least a portion 42 of central body portion 22. It is believed that the extension 42 of surface 40 along central body portion 22 supports arcuate portion 38 so as to resist downward forces transmitted through portion 38 from an insert 12 supported on surface 26 while in use as hereafter described, which would tend to cause arcuate portion 38 to break if it were not supported in the downwardly and rearwardly directions.

Body 20 of tool support 10 further includes a third body portion 44, which as shown extends in the direction opposite to the direction second body portion 24 extends from central body portion 22, and is adapted to cooperate with clamping means, for example clamping member 46. Third body portion 44 includes a hole 36 through which a machine screw 34 may extend to further releasably secure tool support 10 to tool holder 16.

Figure 2:
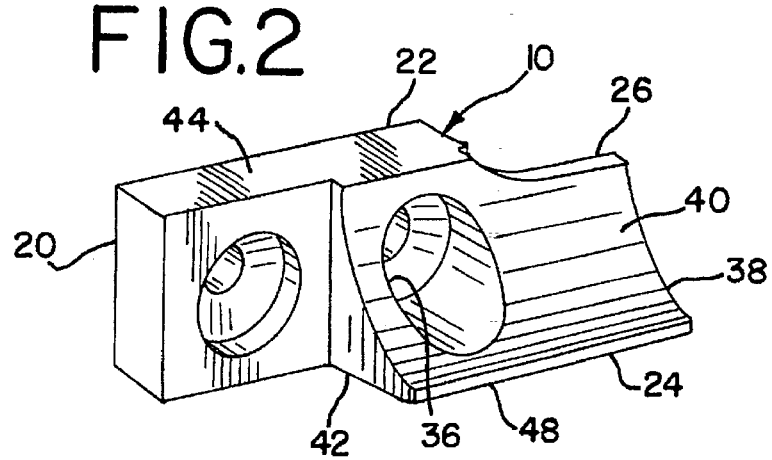
FIG. 2 is a perspective view of the tool support shown in FIG. 1.

As best seen in FIGS. 2 and 4, central body portion 22 has a thickness which is substantially greater than the thickness of second body portion 24 and third body portion 44. Third body portion 44 is rectangular in cross-section, while central body portion 22 has a greater thickness at its bottom 48 (FIG. 5) as determined by extension 42 of arcuate surface 40 than at its top where the thickness is substantially the same as the thickness of the top of second body portion 24.

Tool support body 20 includes an integral portion 30 which is adapted to closely fit into a receiving channel or rabbet 50 in the head or outer end of tool holder 16 to inhibit vertical movement of tool support 10 when it secured to tool holder 16.

As best shown in FIG. 1, the arcuate shape of second body portion 24 is particularly adapted to enter the groove 52 cut into face 54 in workpiece 14 by an insert 12 supported by and clamped to tool support 10. The tool support 10 of the present invention can be readily replaced on the tool holder 16 to support inserts 12 of various widths to cut grooves of corresponding widths without disturbing the tool holder 16, and is advantageously used to support those inserts 12 in cutting relatively deep, circular or concentric grooves in the face 54 of workpiece 14. Tool support 10 of the present invention provides support for inserts 12 as the inserts progress into the workpiece while resisting downwardly and rearwardly directed forces transmitted from the insert as it cuts the workpiece.

In another embodiment, as shown in FIG. 6, the tool support 10 is positioned 90 degrees to the elongation of a tool holder 60, which can be substantially similar to tool holder 16, except that the threaded holes to receive machine screws 34 and the rabbet to receive portion 50 are position in the end of holder 60. Tool holder 10 is the same as in the first described embodiment, and the same clamping member 46 can be utilized. In the embodiment shown in FIG. 6, the axis of the workpiece can be positioned 90 degrees to the elongation of the tool holder 60, i.e. facing the arcuate end of tool support 10 and insert 12.

As heretofore noted, although the invention is shown as being secured to a stationary portion of a machine tool and the workpiece rotated, the invention is also applicable to being secured to a rotating portion of the machine tool, such as a in a milling type machine, and the workpiece held stationary.

While particular embodiments of the tool support structure of the invention have been shown and described, it will be appreciated by those skilled in the art that changes and modifications may be made thereto without departing from the invention in its broader aspects and as set forth in the following claims.

What is claimed is:

1. A replaceable tool support for a tool which extends in a longitudinal direction for use with a tool holder having a surface generally parallel to the longitudinal direction in which the tool extends, the tool support comprising a tool support body having:

a) a central body portion;

b) a second body portion extending from said central portion and having a first surface portion adapted to support a tool thereon, said second body portion and said first surface portion extending from said central body portion in a first direction generally parallel to the surface of the tool holder which is generally parallel to the longitudinal direction in which the tool extends;

c) a third body portion extending from said central body portion in the opposite direction from which said second body portion and said first surface portion extend, and said third body portion having at least one surface having a portion adapted to be placed in abutting relationship with the surface of the of the tool holder generally parallel to the longitudinal direction in which the tool extends, the junction therebetween defining a plane generally parallel to the longitudinal direction in which the tool extends;

d) said second body portion extending arcuately from said first surface portion away from the plane defined by the junction between the at least said one surface and the tool holder and defining an arcuate outer surface, said second body portion arcuately converging as it extends from said first surface portion, and said central body portion having an arcuate outer surface which extends from and defines a curved plane with said arcuate outer surface of said second body portion, whereby the second portion may enter arcuate spaces formed by the tool in a workpiece;

e) said central body portion including means for removably securing said body to the tool holder which extends through said arcuate surface thereof, whereby said body can be removably replaced with respect to the tool holder to permit the use of selected tools and tool supports with a single tool holder.

2. The tool support of claim 1, wherein said body includes a body portion adapted to cooperate with clamping means for securing the tool to said first surface.

3. The tool support of claim 2, wherein said body portion adapted to cooperate with clamping means includes means for removably securing said body to the tool holder.

4. The tool support of claim 3, wherein said body portion adapted to cooperate with clamping means is a portion of said central body portion.

5. The tool support of claim 3, wherein said portion adapted to cooperate with clamping means is said third body portion extending from said central body portion.

6. The tool support of claim 1, wherein said body includes a body portion adapted to cooperate with clamping means for securing the tool to said first surface and includes additional means for removably securing said body to the tool holder.

7. The tool support of claim 1, wherein said central body portion has a first thickness and said second body portion has a substantially lesser thickness than said central portion.

8. The tool support of claim 7, wherein said body includes a body portion adapted to cooperate with clamping means for securing the tool to said first surface.

9. The tool support of claim 8, wherein said body portion adapted to cooperate with clamping means includes means for removably securing said body to the tool holder.

10. The tool support of claim 9, wherein said body portion adapted to cooperate with clamping means is a portion of said central body portion.

11. The tool support of claim 9, wherein said portion adapted to cooperate with clamping means is said third body portion extending from said central body portion and is of lesser thickness than said central body portion.

12. The tool support of claim 7, wherein said body includes a body portion adapted to cooperate with clamping means for securing the tool to said first surface and includes additional means for removably securing said body to the tool holder.

* * * * *